(No Model.)  4 Sheets—Sheet 1.
J. C. MILLER.
BICYCLE LANTERN.
No. 599,149. Patented Feb. 15, 1898.
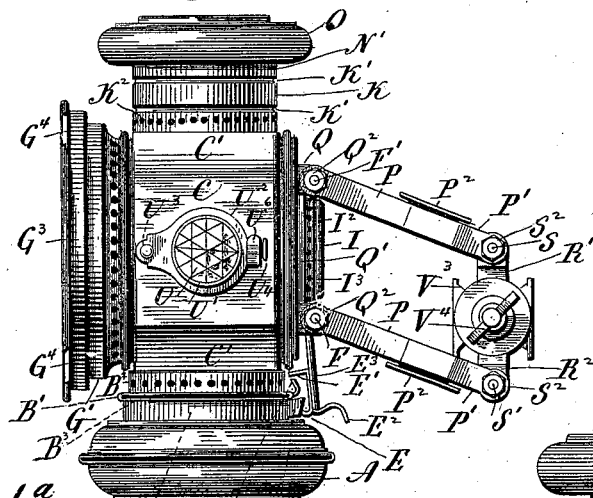
Fig. 1
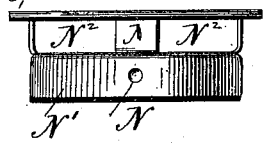
Fig. 4ª
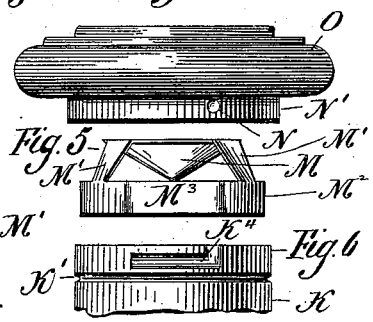
Fig. 4
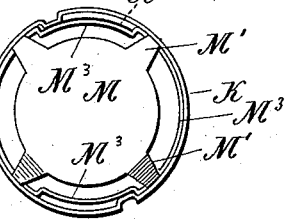
Fig. 5  Fig. 6  Fig. 6ª
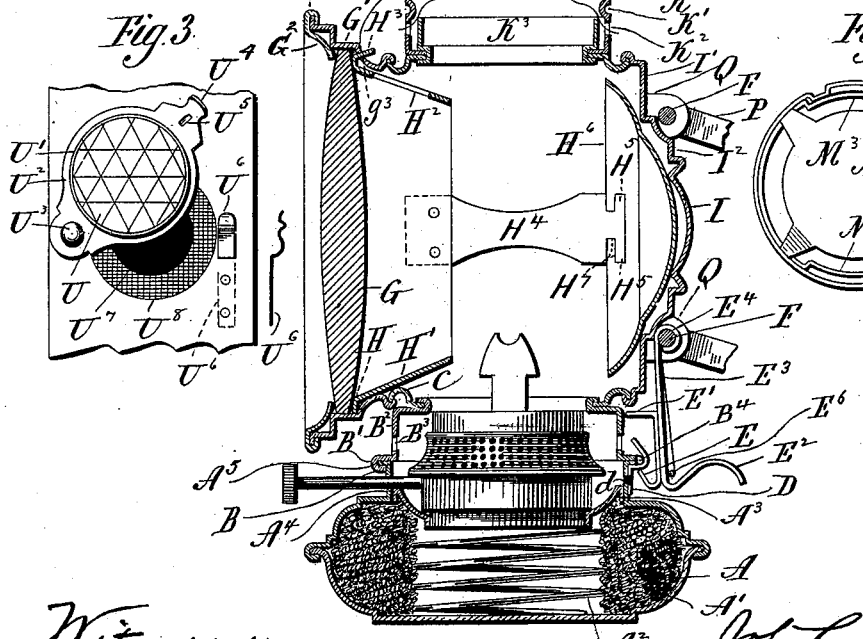
Fig. 2  Fig. 3
Witnesses
J. H. Thurmy
Ellen Scarborough
John C. Miller,
Inventor.
By Atty Earle Seymour (No Model.) 4 Sheets—Sheet 2.
J. C. MILLER.
BICYCLE LANTERN.
No. 599,149. Patented Feb. 15, 1898.
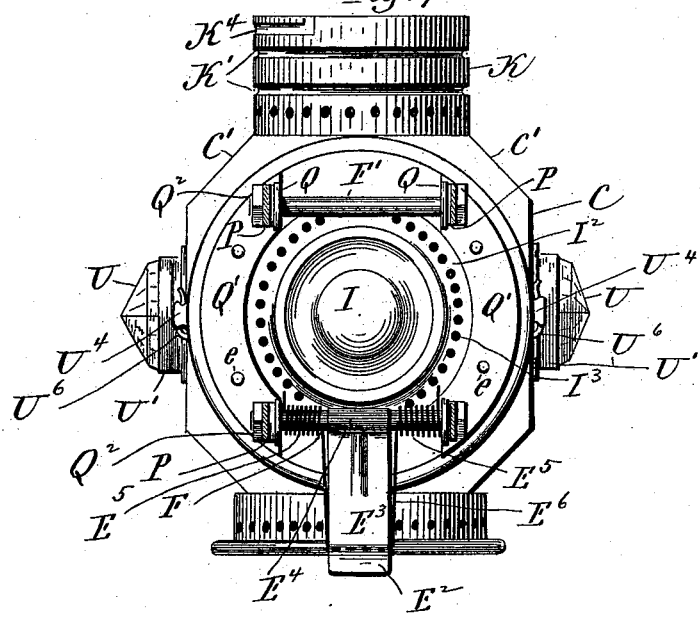
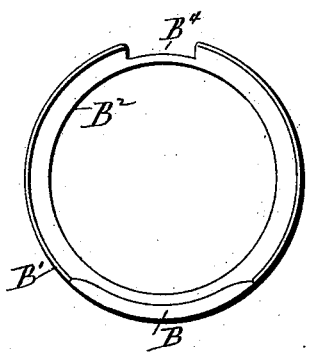
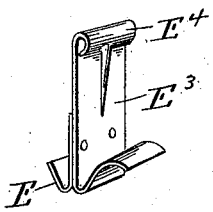
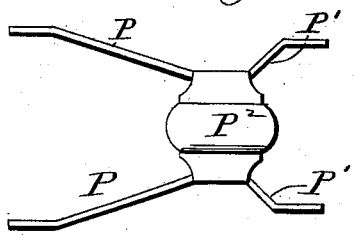

(No Model.) 4 Sheets—Sheet 3.
J. C. MILLER.
BICYCLE LANTERN.
No. 599,149. Patented Feb. 15, 1898.
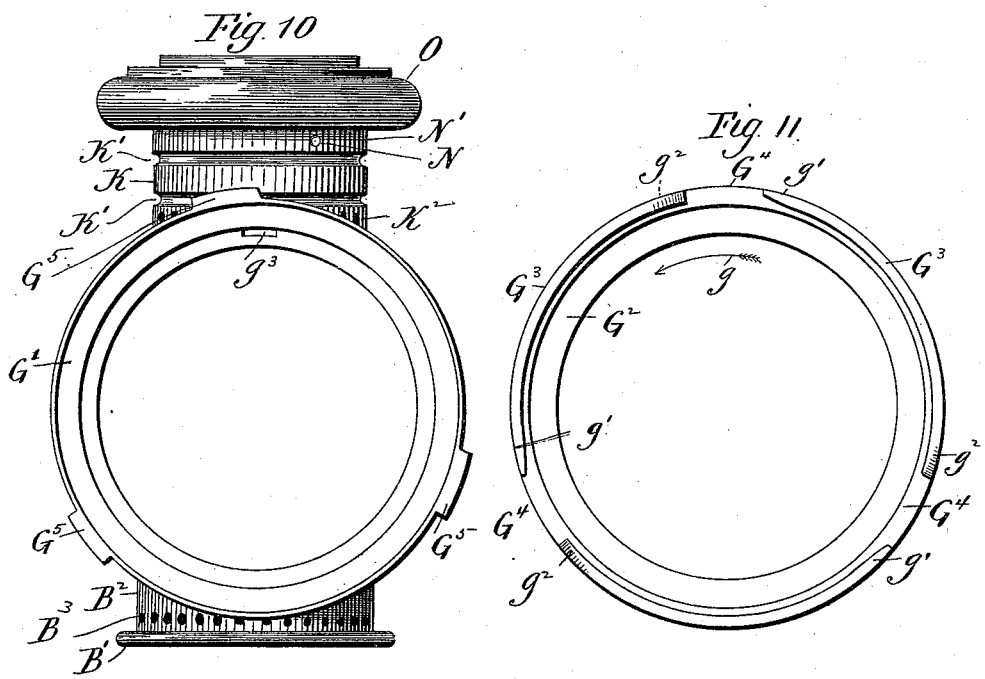
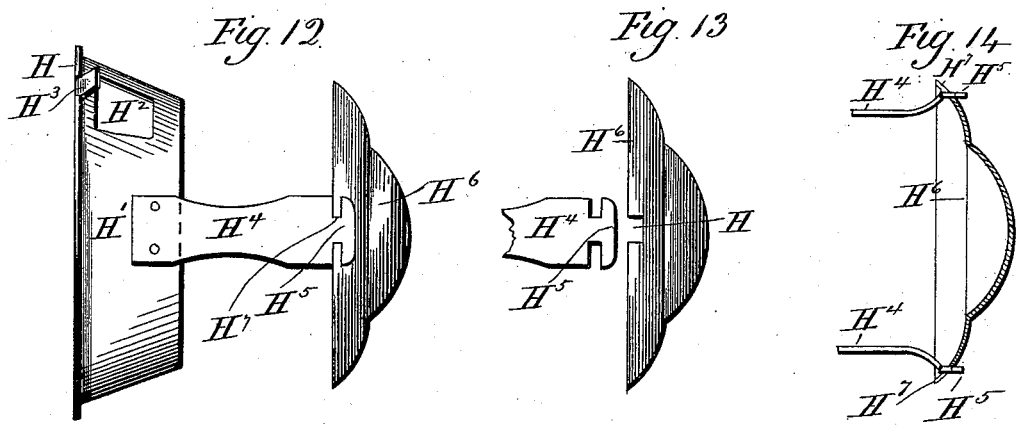

(No Model.)　　　　　　　　　　J. C. MILLER.　　　　　　4 Sheets—Sheet 4.
BICYCLE LANTERN.
No. 599,149.　　　　　　　　　　　　　　Patented Feb. 15, 1898.
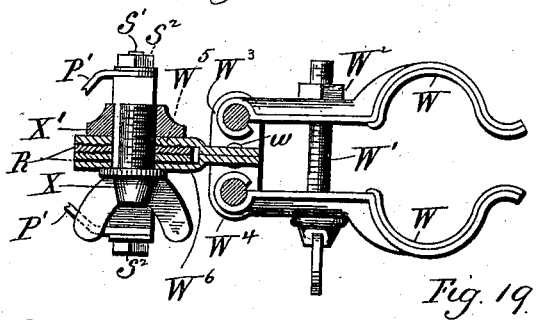
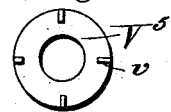
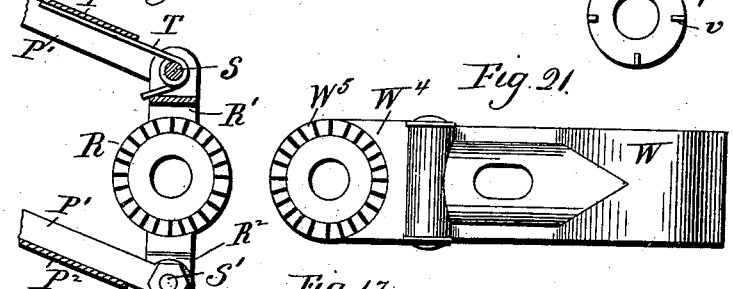
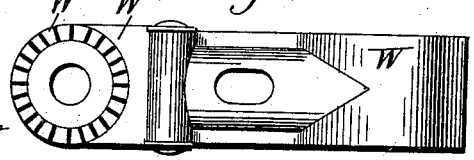
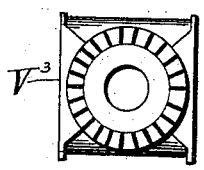
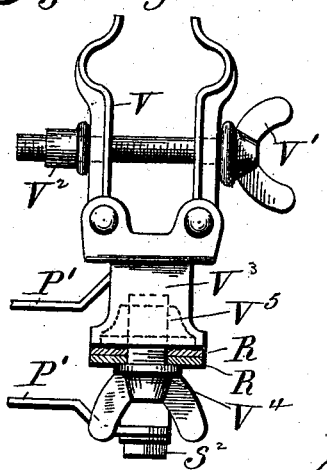
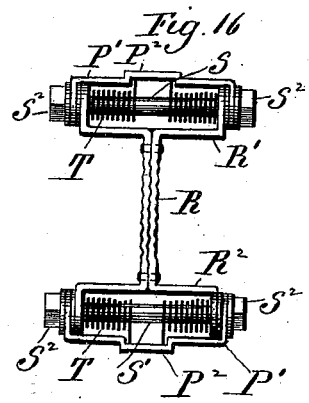

UNITED STATES PATENT OFFICE.

JOHN C. MILLER, OF WATERBURY, CONNECTICUT, ASSIGNOR TO THE MATTHEWS & WILLARD MANUFACTURING COMPANY, OF SAME PLACE.

BICYCLE-LANTERN.

SPECIFICATION forming part of Letters Patent No. 599,149, dated February 15, 1898.

Application filed February 24, 1897. Serial No. 624,847. (No model.)

*To all whom it may concern:*

Be it known that I, JOHN C. MILLER, of Waterbury, in the county of New Haven and State of Connecticut, have invented a new Improvement in Bicycle-Lanterns; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation, on a reduced scale, of one form which a lantern constructed in accordance with my invention may assume; Fig. 2, a view of the lantern in vertical central section with the suspension-frames broken away; Fig. 3, a broken view of the body of the lantern, showing one of the bull's-eyes and the annular match-lighting surface which the same normally covers; Fig. 4, a detached view of the lantern-cap; Fig. $4^a$, a detached view of the cap-supporting ring; Fig. 5, a detached broken view, in side elevation, showing the upper end of the sleeve into which the current-breaker is set and to which the cap is applied; Fig. 6, a detail view of the cap; Fig. $6^a$, a detached plan view of the sleeve and current-breaker with the cap removed; Fig. 7, a view of the lantern in rear elevation with the cap and current-breaker and fount removed and with the suspension-frames shown in section; Fig. 8, a detached perspective view of the fount-catch; Fig. $8^a$, a detached perspective view of the fount-catch plate; Fig. $8^b$, a detached reverse plan view of the fount-supporting collar; Fig. 9, a detached plan view of one of the suspension-frames; Fig. 10, a broken view of the lantern in front elevation with the lens-retaining ring removed as well as the reflector; Fig. 11, a detached view, in inside elevation, of the lens-retaining ring. Fig. 12, a detached view, in side elevation, of the reflector; Fig. 13, a less comprehensive view showing the reflector-cup detached from one of the reflector-arms; Fig. 14, a sectional view showing the reflector-cup as connected with the reflector-arms; Fig. 15, a view in vertical section through the rear ends of the suspension-frames and showing the yoke connecting the same; Fig. 16, a view in rear elevation of the frames and yoke; Fig. 17, a plan view of a fork-clip containing my invention; Fig. 18, a detached view showing the tubular box of the said clip and the corrugations formed upon the end of the said box; Fig. 19, a detached view, in inside elevation, of the nut employed with this clip; Fig. 20, a view, partly in plan and partly in section, of a steering-head clip containing my invention; Fig. 21, a view of the said clip in side elevation.

My invention relates to an improvement in bicycle-lanterns, the object being to produce a simple, compact, light, and effective lantern constructed with particular reference to ease and convenience of dismemberment and reassemblance for the purpose of cleansing and repair, if need be, to preventing the oil from splashing over, and to protecting the flame, so that it will not be extinguished under any conditions of draft to which the lantern may be exposed in any ordinary use of it.

With these ends in view my invention consists in a lantern having certain details of construction and combinations of parts, as will be hereinafter described, and pointed out in the claims.

In carrying out my invention, as herein shown, my improved lantern is furnished with a flattened circular fount A, which may be of any approved construction. The outer portion of this fount is stuffed with loose fiber A', such as cotton or other equivalent material, and held in place by a large centrally-arranged wire coil $A^2$, the upper end of which receives the lower edge of a conical ring $A^3$, which performs the threefold office of holding the said coil $A^2$ in place, of assisting in preventing the oil from being thrown out of the fount under severe concussion, and also of directing the oil toward the center of the fount when the same is being filled. The upper and main portion of the said conical ring $A^3$ is concavo-convex in form, while its lower portion is cylindrical in form. The deep circular space within the wire coil $A^2$ receives the wick of the burner, which may be of any approved construction and which I have not shown. The fiber A' is employed to prevent the oil from swashing about in the fount. The said fount is furnished upon its top with a suspension-collar $A^4$, having the said ring $A^3$ located within its lower portion and having its upper edge turned outward to form a suspension-flange $A^5$, the forward portion of which is caught under a lip B, Fig. $8^b$, formed upon the forward portion of the outwardly-turned flange B' of the fount-supporting collar $B^2$, which has a band of perforations $B^3$ formed in it and which at its upper edge is turned inward and outward, as shown in Fig. 2, for the purpose of being locked into the lower end of the main or body portion C of the lamp, the said main or body portion being square in general form, with its corners C' concaved, as clearly shown in Fig. 1. A sheet-metal fount-catch plate D, rigidly secured by means of a rivet $d$ to the outer face of the suspension-collar $A^4$, is provided for being engaged by a sheet-metal fount-catch comprising a locking-finger E, which coacts with the catch-plate before mentioned, a stop-finger E', located above the locking-finger E and extending inward for engagement with the fount-supporting collar $B^2$, so as to limit the inward movement of the catch, and with an outwardly-extending bowed finger-piece $E^2$, by means of which the fount-catch is operated. The flange B' of the fount-supporting collar $B^2$ is cut away, as at $B^4$, Fig. $8^b$, to clear the locking-finger E of the fount-catch as the same is swung into and out of locking position. The said fingers are riveted or otherwise secured to the lower end of a swinging plate $E^3$, the upper end of which is bent outward to form a tube $E^4$, by means of which the plate is pivotally suspended or swung from the center of the horizontal lower suspension-frame pivot F, as shown in Figs. 1, 2, and 7. A wire fount-catch spring, comprising two short coils $E^5 E^5$ and a central downwardly-extending loop $E^6$, is employed for maintaining the said fount-catch in engagement with the fount-catch plate D, a detached view of which is shown by Fig. $8^a$. The coils $E^5 E^5$ of the said spring encircle the opposite ends of the shaft F, the tube $E^4$ of the swinging plate $E^3$ being interposed between them, as shown in Fig. 7. The depending loop $E^6$ of the spring engages with the outer face of the swinging plate, as clearly shown in Figs. 2 and 7. The ends $e\ e$ of the wire forming the said spring are engaged with the back of the lantern, as shown in Fig. 7, and keep the spring under constant tension, which is increased when the swinging plate is swung outward by means of the finger-piece $E^2$.

To connect the fount with the lantern-body C, the forward portion of the suspension-flange $A^5$ of the suspension-collar $A^4$ of the fount is hooked, so to speak, under the loop B of the depending fount-supporting neck $B^2$. The rear portion of the fount is then lifted into right position and the locking-finger E of the spring-catch allowed to snap into the catch-plate D, with which the said finger is maintained in engagement by the tension of the fount-catch spring. To remove the fount the fount-catch is swung outward by means of its finger-piece $E^2$, so as to disengage its locking-finger E from the catch-plate D, after which the rear portion of the fount is swung downward preparatory to the unhooking, as it were, of its forward portion from the fount-supporting collar. The construction described permits the fount to be very conveniently attached to and removed from the body of the lantern and at the same time provides for holding it firmly in place.

The lens G of the lantern is located within a conical lens-holder G', arranged in a vertical plane and secured by its inner edge to the front of the rectangular lantern-body C. The lens-holder is ribbed or stepped in form, as shown in Figs. 1 and 2, one of its ribs or steps having an annular shoulder $d$. The lens is retained within this holder by means of a lens-holding ring $G^2$, the concaved inner portion of which enters the outer end of the holder and engages with the edge of the outer face of the lens, as clearly shown in Fig. 2. The outer edge of the said ring is turned inward to form three corresponding segmental locking-flanges $G^3 G^3 G^3$, separated from each other by clearance-spaces $G^4 G^4 G^4$, as best shown in Fig. 11. These flanges adapt the ring to be engaged with three radially-arranged locking-fingers $G^5 G^5 G^5$, formed upon the extreme outer edge of the conical lens-holder and arranged equidistant from each other, their spacing corresponding to the spacing of the clearance-spaces $G^4 G^4 G^4$. To apply the lens-holding ring to the lens-holder, its spaces $G^4$ are registered with the locking-fingers $G^5$, after which the ring is rotated in the direction of the arrow $g$, (shown in Fig. 11,) whereby the flanges $G^3$ are engaged with the respective fingers $G^5$ and the lens-holding ring $G^2$ drawn inward until it is seated solidly upon the conical lens-holder. The drawing inward of the ring, as described, is effected by the pitch of the flanges $G^3$, which are slightly pitched from their open forward ends $g'$ to their closed inner ends $g^2$, as indicated in Fig. 11. This mode of holding the lens in place by means of a removable ring I consider much more effective than the contractible retaining-wire heretofore generally used. The said retaining-ring $G^2$ holds the lens against the outwardly-turned flange H of a conical reflector-ring H', the interior surface of which is silvered and brightly burnished, the said flange H of the reflector-ring H' being in turn pressed against the shoulder $d$ of the lens-holder G' by the inward pressure exerted upon the outer face of the said flange by the lens, which in turn is pressed inward by the lens-holding ring $G^2$. The said reflector-ring H' is located partly within the lens-holder G', but extends inwardly into the chamber inclosed by the rectangular body C of the lantern. A draft-opening $H^2$, formed in the upper portion of the said reflector-ring, provides for a draft upward through it and prevents the lens from being possibly smoked, while a locating-finger $H^3$, formed integral with the ring at a point just above the draft-opening H², passes through a small opening g³, formed to receive it in the conical lens-holder, and not only holds the reflector against rotation, but insures its being assembled correctly every time it is returned to the lantern after being taken out for being cleaned or for any other purpose. Two corresponding bowed longitudinally-yielding sheet-metal reflector-arms $H^4$ $H^4$ are riveted by their forward ends to the outer face of the conical reflector-ring, their rear ends being slotted to form coupling-heads $H^5$ $H^5$, which adapt them to have the reflector-cup $H^6$ removably connected with them, the said reflector-cup being for this purpose formed with two oppositely-located slots $H^7$. The conical reflector-ring H' and the reflector-cup $H^6$, when thus joined together by the longitudinally-bowed reflector-arms $H^4$ $H^4$, are handled as one piece in being introduced into and removed from the lantern, and together constitute the reflector thereof. By detaching the reflector-cup $H^6$ from the arms $H^4$ $H^4$ it may be readily refinished, if need be, or cleaned.

The reflector-cup $H^6$ is centered and held in right position by its entrance into a boss I, formed in the circular cap I', which is attached to the rear face of the lantern-body C', the reflecter-cup being maintained in the said boss by the longitudinal inward thrust placed upon the whole reflector by the lens G, which is the main agent for holding the reflector in place. Preferably the parts of the reflector will be so proportioned that after it has been put in place and the lens G has been introduced into the lens-holder and the lens-holding ring $G^2$ applied thereto the arms $G^4$ will be just sprung enough to take up all lost motion in the reflector and securely hold it against rattling. I may here note that the flexibility of the arms $H^4$ provides for some variation in the thickness of the lenses G. It will be apparent that by removing the lens-holding ring $G^2$ and the lens G the entire reflector may be very easily slipped out of the lantern and cleaned and as readily replaced, and all without any danger of marring its burnished reflecting-surfaces. This reflector, I may add, is not limited to use in lanterns having the other details of construction shown, but may be used in all lanterns to which it is applicable.

To the top of the square lantern-body C', I permanently secure a cap-supporting collar K, having two annular beads K' K' and formed near its lower edge with a band of perforations $K^2$. This collar is permanently secured to the top of the lantern-body by means of an annular draft-fender $K^3$, which rises sufficiently high within it to form a fender for the small currents of air which enter through the perforations $K^2$. Within the top of the said collar K is located the main current-breaker, which is removable. This comprises a centrally-arranged inverted cone M, four downwardly-inclined cone-supporting arms M', and a ring $M^2$, the lower edge of which rests upon the upper bead K' of the collar K aforesaid, the said cone M, arms M', and ring $M^2$ being struck out of a single piece of metal and the said ring $M^2$ being set inward at opposite points to form, as it were, shallow clearance-recesses $M^3$ $M^3$, which clear the bayonet-joint grooves $K^3$ $K^3$, formed at opposite points in the upper edge of the said cap-supporting collar K for the reception of the locking-projections N, formed near the lower edge of a removable cap-supporting ring N', designed to be set over the said collar, having large egress-openings $N^2$ and formed at its upper edge with an outwardly-turned flange $N^3$, by means of which the overhanging lantern-cap O is secured to it, the center of the said cap being formed with a group of egress-perforations O'. By reference to Fig. 2 it will be seen that the cone M of the said current-breaker is located centrally with respect to the collar K and to the body of the lantern and deflects the rising currents of air, so as to prevent too strong a draft. It also prevents currents from entering the lantern through the cap thereof, so as to extinguish the flame. I wish to point out in this connection that the sleeve containing the air-inlets and the fender employed to guard them are permanently connected with the lantern-body and that the removable current-breaker and removable cap provide only for the egress of the heated air and gases.

The circular cap I', secured to the back of the lantern-body, is struck up to form the central boss I, before mentioned, and also to form a raised annular band $I^2$, encircling the said boss and containing a band of perforations $I^3$, the striking up of the cap in the manner described giving more room within the lantern.

The lantern is yieldingly supported or suspended from the bicycle by means of two corresponding suspension-frames, each consisting of two long diverging forwardly-projecting arms P P, two short diverging rearwardly-projecting arms P' P', and a transversely-arranged bridge or web $P^2$. The ends of the arms P P are perforated for the reception of long pivots F F', which are supported in lugs Q, formed at the ends of segmental plates Q' Q', which are secured by rivets to the outer face of the cap I', as clearly shown in Fig. 7. The outer ends of the long pivots F and F' are threaded for the reception of nuts $Q^2$, by means of which the said arms P of the supporting-frames are secured in place. The lower pivot F has already been referred to in connection with its support of the swinging fount-catch. These two supporting-frames have their rear ends connected by means of a yoke, (shown clearly in Fig. 16,) and comprise two corresponding members which are riveted together and each of which consists of a central corrugated disk R, an upper arm R', and a lower arm $R^2$, the corrugated disks R standing at a right angle to the plane of the completed yoke. The upper arms R' R' of the said two yoke members terminate in upwardly-projecting lugs, which afford bearing for a long pivot S, by means of which the rear arms P' P' of the upper suspension-frame are connected with the upper end of the yoke, while the lower arms of the yoke members $R^2$ $R^2$ terminate in downwardly-projecting lugs which afford bearing for a pivot S', which is employed to connect the lower end of the yoke with the rear end of the lower suspension-frame, through the short rear arms P' P' of which it passes. The short rearwardly-extending arms P' P' of the said suspension-frames are perforated for the reception of the said long pivots S' S', upon which they are secured by nuts $S^2$. The pivots S' S' also carry springs T T, which are coiled upon them, and both of which comprise forwardly-extending loops T', the loop of the upper spring engaging with the inner face of the bridge or web $P^2$ of the upper suspension-frame and the loop of the lower spring engaging with the inner face of the bridge or web $P^2$ of the lower suspension-frame. These springs are proportioned in strength, so that under normal conditions they will carry the lantern in the position shown by Fig. 1, with the forward ends of the suspension-frames raised above the rear ends thereof. Under such jolting and jarring as the lantern receives when applied to a bicycle the springs allow the lantern to play up and down and prevent any shocks from being conveyed directly to it. Broadly speaking, however, suspension-frames combined with springs are not new with me.

I provide the sides of the main or body portion of the lantern with colored bull's-eyes U U, mounted in bezels U' U', secured to plates $U^2$, through the forward ends of which pivots $E^3$ pass for pivotally securing them to the body portion of the lantern. The rear ends of these plates are formed with operating-fingers $U^4$, by means of which they are lifted and depressed. The rear ends of the plates are also furnished with retaining-lugs $U^5$, which are engaged by bowed retaining-fingers $U^6$, formed independently of and set into the sides of the body portion, which is formed with two circular openings $U^7$ $U^7$, located opposite each other and normally covered by the bull's-eyes. These openings permit the light to shine through the bull's-eyes and also provide for the convenient lighting of the lantern. Around each opening I preferably roughen the metal of the body portion, as at $U^8$, to facilitate the striking of matches, the said roughened portions of the metal being normally concealed by the pivotal bull's-eye frames $U^2$.

For securing the lantern to the bicycle a clip is used, its construction depending upon the choice of the bicycle steering head or fork as the point of attachment for the lantern. A variety of clips may be used. I prefer, however, to employ a specially-designed clip of my invention.

As shown in Figs. 17, 18, and 19, my improved clip is a steering-fork clip, and as shown in Figs. 20 and 21 is a steering-head clip. The fork-clip comprises two corresponding pivotal fork-grasping arms V V, provided with a thumb-screw V' and nut $V^2$ and pivotally mounted in a tubular box-like frame $V^3$, the tubular outer end of which is circularly corrugated inside and outside, as at $V^4$. One of the corrugated disks R is held against the corrugated outside of the frame $V^3$ of the yoke by means of a thumb-screw $V^4$ and a nut $V^5$, the inner face of which is furnished with teeth $v$, as shown in Fig. 19. The said nut, as shown in Fig. 17, is located within the tubular frame, and its teeth $v$ coact with the inside corrugations thereof. It will be understood, of course, that by loosening the thumb-screw $V^4$ the lantern may be set at any required pitch with respect to the clip, which of course has to maintain a fixed position with respect to the bicycle-fork.

In the construction shown by Figs 20 and 21, which show a steering-head clip, the same is shown as consisting of two corresponding pivotal arms W W, which are drawn together by means of a thumb-screw W' and nut $W^2$ The said pivotal arms are mounted in a frame composed of two plates $W^3$ and $W^4$, riveted together by rivets $w$. The plate $W^3$ is formed with a large forwardly-extending centrally-perforated corrugated lug $W^5$, while the plate $W^4$ is formed with a similar but non-corrugated lug $W^6$, these lugs being sufficiently separated from each other to receive between them, as shown in Fig. 20, the two corrugated disks R of the yoke employed to connect the rear ends of the two suspension-frames. The lantern is connected to this clip by means of a thumb-screw X and a nut X', which is like the nut $V^5$, (shown by Fig. 19,) the corrugated disks of the yoke being inserted between the two lugs of the clip and the corrugated surfaces being drawn together by the thumb-screw and nut. It will be apparent also that by means of this construction the lantern may be set at any desired pitch with respect to the clip.

It is apparent that in carrying out my invention some changes from the construction herein shown and described may be made. It is also apparent that the several features of my improved lamp are not necessarily used in the same lamp, but that one or more of them may be used as desired. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. A bicycle-lantern fount having a suspension-collar than which it is larger in diameter, and a combined funnel and fender secured in place within the lower portion of the said collar, and consisting of a ring, the upper part of which is flaring and the lower part straight and adapted to receive the lower portion of the burner.

2. In a bicycle-lantern, the combination with a fount, provided upon its top with a flanged suspension-collar, of a lantern-body provided with a depending fount-supporting collar formed with a lip into which the forward portion of the flange of the said suspension-collar is hooked, a fount-catch plate secured to the said suspension-collar of the fount, and a suspended, swinging fount-catch connected with the body of the lantern and depending in position to engage with the said fount-catch plate.

3. In a bicycle-lantern, the combination with the main or body portion thereof, of a removable fount, two suspension-frames connected with the lantern for affording a yielding support for the same, and a swinging, spring-actuated fount-catch suspended from the central portion of the pivot of the lower suspension-frame of the lantern.

4. In a bicycle-lantern, the combination with the main or body portion thereof, of a removable fount, an upper and a lower suspension-frame connected with the lantern for affording a yielding support for the same, a swinging spring-actuated fount-catch comprising a locking-finger, a stop-finger, a finger-piece, and a plate the upper end of which is adapted to be suspended from the pivot of the lower suspension-frame; and a spring engaging with the said plate and coiled upon the said pivot.

5. In a bicycle-lantern, the combination with the body thereof, of a conical lens-holder applied to the said body and formed within its forward edge with an annular shoulder, a removable lens-holding ring adapted to be secured to the forward end of the said lens-holder and to extend inwardly thereinto to engage with the outer face of the edge of the lens; and a reflector comprising a reflector-ring adapted to fit within the said conical lens-holder, two arms connected with the said ring and extending rearwardly into the back portion of the lantern-body, and a reflector-cup located in the rear portion of the said body and attached to the rear ends of the said arms, the outer edge of the reflector-ring being adapted to be engaged with the said shoulder against which it is pressed by the lens which is pressed inward by the removable lens-holding ring, substantially as set forth.

6. In a bicycle-lantern, the combination with the body thereof, of a conical lens-holder secured to the front of the said body, formed between its rear and forward edges with an annular shoulder, and formed upon its outer edge with radial fingers, a reflector adapted to be introduced into and removed from the lantern-body through the said lens-holder, and adapted at its outer edge to take a bearing upon the said shoulder thereof, and a removable lens-holding ring adapted to engage with the lens which it presses inward upon the edge of the reflector, which in turn is pressed inward against the said shoulder, and the said ring being furnished with inwardly-turned segmental locking-flanges for coaction with the radial fingers of the lens-holder, whereby as the ring is turned inwardly it is drawn inward against the lens.

7. A reflector comprising a conical reflector-ring, a reflector-cup and two longitudinally-bowed spring-arms permanently connected with the ring at their forward ends, and adapted to have the cup removably connected with their rear ends.

8. In a bicycle-lantern, the combination with the body thereof, of a conical lens-holder secured thereto, a removable lens-retaining ring connected with the forward edge of the lens-holder, a reflector comprising a reflector-cup, two arms connected with the same, and a reflector-ring which is also connected with the said arms, and partly located within the lens-holder; and a lens which is placed against the forward edge of the reflector-ring, and exerts an inward thrust upon the same so as to hold it and therefore the cup in place.

9. In a bicycle-lantern, the combination with the body thereof, of a conical lens-holder, a removable lens-holding ring adapted to be connected with the forward edge of the said holder, and a reflector comprising a reflector-cup, two arms, and a reflector-ring which is formed with a draft-opening and with a locating-finger which coacts with the lens-holder for insuring the right location of the reflector within the body of the lantern.

10. In a bicycle-lantern, the combination with the body thereof, of a cylindrical cap-supporting collar permanently secured to the said body than which it is smaller in diameter, and formed near its lower end with air-inlet openings, an annular fender permanently secured within the lower portion of the said collar, and guarding the said air-inlet openings, a removable current-breaker adapted to be set into the upper end of the collar in which it is supported, a cap-supporting ring adapted to be set over the upper end of the said collar and removably connected therewith, and containing air-egress openings, and a cap connected with the said ring and adapted to receive the upper portion of the current-breaker which extends upward into it.

11. In a bicycle-lantern, the combination with the body thereof, of a cap-supporting collar permanently secured to the said body, than which it is smaller in diameter, and having its lower portion formed with air-inlet openings, an annular fender permanently located within the lower end of the said collar close to the said openings, a removable conical current-breaker, comprising a cone, arms extending outwardly and downwardly therefrom, and a ring in which the lower ends of the said arms terminate, and which is set within the upper end of the said collar; a cap-supporting ring set over the upper end of the said collar, and removably connected therewith, and containing air-egress openings, and a cap connected with the upper edge of the said cap-supporting ring and inclosing as it were, the said current-breaker.

12. In a bicycle-lantern, the combination with the body thereof, of two suspension-frames pivotally connected at their forward ends with the back of said body, and a yoke connecting the rear ends of the said frames and comprising two corresponding sheet-metal members which are riveted together, and each of which consists of a centrally-corrugated disk and an upper and a lower arm.

13. In a bicycle-lantern, the combination with the body thereof, of a reflector comprising a reflector-ring, two arms connected with the said ring and extending rearwardly into the back portion of the lantern-body, and a reflector-cup located in the rear portion of the said body and attached to the rear ends of the said arms, whereby the said reflector may be introduced into and removed from the lantern-body as though made in one piece, and means for holding the reflector in place in the lantern-body.

In testimony whereof I have signed this specification in the presence of two subscribing witnesses.

JOHN C. MILLER.

Witnesses:
  FRED. C. EARLE,
  ELLEN SCARBOROUGH.